US011568425B2

(12) United States Patent
Kim et al.

(10) Patent No.: US 11,568,425 B2
(45) Date of Patent: Jan. 31, 2023

(54) COMPUTERIZED SYSTEMS AND METHODS FOR DETECTING PRODUCT TITLE INACCURACIES

(71) Applicant: Coupang Corp., Seoul (KR)

(72) Inventors: Tae Suk Kim, Seoul (KR); Su Hwan Ahn, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 16/799,150

(22) Filed: Feb. 24, 2020

(65) Prior Publication Data

US 2021/0264442 A1 Aug. 26, 2021

(51) Int. Cl.
*G06Q 30/00* (2012.01)
*G06N 5/04* (2006.01)
(Continued)

(52) U.S. Cl.
CPC ......... *G06Q 30/0185* (2013.01); *G06F 40/30* (2020.01); *G06N 5/04* (2013.01); *G06N 20/00* (2019.01); *G06V 20/00* (2022.01)

(58) Field of Classification Search
CPC .... G06Q 30/00; G06Q 30/0185; G10L 15/19; G06F 17/278; G06F 17/2785; G06F 17/2818
See application file for complete search history.

(56) References Cited

U.S. PATENT DOCUMENTS

| 7,870,039 | B1 * | 1/2011 | Dom | G06Q 30/0613 |
| | | | | 705/26.41 |
| 8,463,805 | B2 * | 6/2013 | Osborn | G06Q 30/0201 |
| | | | | 707/765 |

(Continued)

FOREIGN PATENT DOCUMENTS

| CN | 107330752 A | 11/2017 |
| CN | 107533547 A | 1/2018 |

(Continued)

OTHER PUBLICATIONS

Katyayana, "Collation of machine learning algorithms for product title generation in E-commerce" (Year: 2020).*

(Continued)

*Primary Examiner* — Sangeeta Bahl
(74) *Attorney, Agent, or Firm* — Finnegan, Henderson, Farabow, Garrett & Dunner LLP

(57) ABSTRACT

Systems and methods are provided for detecting inaccuracy in a product title, comprising identifying, by running a string algorithm on a title associated with a product, at least one product type associated with the product, predicting, using a machine learning algorithm, at least one product type associated with the product based on the title, detecting an inaccuracy in the title, based on at least one of the identification or the prediction, and outputting, to a remote device, a message indicating that the title comprises the inaccuracy. Running the string algorithm may comprise receiving a set of strings, generating a trie based on the received set of strings, receiving the title, and traversing the generated trie using the title to find a match. Using the machine learning algorithm may comprise identifying words in the title, learning a vector representation for each character n-gram of each word, and summing each character n-gram.

14 Claims, 9 Drawing Sheets

(51) Int. Cl.
*G06F 40/30* (2020.01)
*G06N 20/00* (2019.01)
*G06V 20/00* (2022.01)

(56) References Cited

U.S. PATENT DOCUMENTS

| | | | | |
|---|---|---|---|---|
| 8,504,567 | B2* | 8/2013 | Billawala | G06F 16/338 |
| | | | | 707/736 |
| 8,655,737 | B1* | 2/2014 | Tromble | G06Q 30/00 |
| | | | | 705/26.1 |
| 8,812,420 | B2* | 8/2014 | Wang | G06N 5/04 |
| | | | | 706/46 |
| 8,898,169 | B2* | 11/2014 | Gokturk | G06Q 30/0278 |
| | | | | 707/740 |
| 9,047,369 | B2* | 6/2015 | Miao | G06F 16/285 |
| | | | | 707/740 |
| 9,311,372 | B2* | 4/2016 | Garera | G06F 16/258 |
| 2013/0290320 | A1 | 10/2013 | Zhu et al. | |
| 2016/0078507 | A1* | 3/2016 | Shivaswamy | G06Q 30/0605 |
| | | | | 705/26.2 |
| 2018/0068371 | A1* | 3/2018 | Krishnamurthy | G06N 3/0427 |
| 2018/0101893 | A1* | 4/2018 | Dagan | G06Q 30/0641 |
| 2018/0341998 | A1 | 11/2018 | Amarthaluri et al. | |
| 2019/0079925 | A1 | 3/2019 | Wang et al. | |
| 2019/0205376 | A1* | 7/2019 | Merhav | G06F 40/284 |
| 2020/0311542 | A1* | 10/2020 | Wang | G06N 3/04 |

FOREIGN PATENT DOCUMENTS

| | | | | |
|---|---|---|---|---|
| JP | 2020-004425 | | 1/2020 | |
| KR | 10-2010-0121690 | | 11/2010 | |
| KR | 10-2019-0030435 | | 3/2019 | |
| WO | WO-2013163062 A1 * | 10/2013 | ....... G06F 17/30861 |

OTHER PUBLICATIONS

Ho, "product title classification" (Year: 2012).*
Magnani, "A deep multimodal fusion for product classification" (Year: 2016).*
International Search Report and Written Opinion in counterpart Application No. PCT/IB2020/061779 dated Mar. 16, 2021 (7 pages).
Korean Notice of Preliminary Rejection in Korean Application No. 10-2020-0054617, dated May 7, 2020 (15 pages).
Notice of Allowance dated Oct. 18, 2021, in counterpart Korean Application No. 10-2020-0054617 (4 pages).
Taiwanese Office Action in Taiwanese Application No. 109146659, dated Nov. 30, 2021 (25 pages).
Rejection Decision in counterpart Taiwanese Patent Application No. 109146659 dated May 25, 2022 (9 pages).
Examination Notice in counterpart Hong Kong Patent Application No. 22021023333.8 dated Feb. 28, 2022 (6 pages).

* cited by examiner

FIG. 1D

COMPUTERIZED SYSTEMS AND METHODS FOR DETECTING PRODUCT TITLE INACCURACIES

TECHNICAL FIELD

The present disclosure generally relates to computerized systems and methods for detecting inaccuracies in a product title. In particular, embodiments of the present disclosure relate to inventive and unconventional systems relate to detecting inaccuracies in a product title by running a string algorithm on the product title and/or using a machine learning algorithm to predict a product type associated with the product based on the product title.

BACKGROUND

Consumers often shop for and purchase various items online through computers and smart devices. These online shoppers often rely on searching through categories of products to find products to purchase. However, the normal online shopping experience is hindered by incorrect or inaccurate product titles.

Millions of products are registered online by sellers every day. Sellers are required to provide information about their products, including the title of each product. However, often times, many sellers include irrelevant words or other inaccurate information in the product title, which do not assist in describing the actual product. For example, in third party platforms for selling products, many sellers input convoluted, messy, fraudulent, or arbitrary titles for product listings for various reasons. In one instance, sellers may input irrelevant words in the product titles as an attempt to create various search tags. For example, if a product includes a disposable cup, sellers may assign a product title, such as a "disposable cup, dish, container, straw, cap, liquid, water," hoping that users searching for a straw would see the disposable cup in their search results. In another instance, sellers may intentionally input titles such that the product would not show up in the search results. Accordingly, sellers may try to draft inaccurate product titles such that the sellers' unpopular products would lose priority over more popular products of the same kind.

Inaccurate product titles may severely reduce a consumer's user experience by prolonging the consumer's product search and by reducing the recommendation quality of the online platform. Furthermore, manually monitoring, filtering, rejecting, or correcting the product titles is often difficult and time-consuming. A consumer's user experience would be significantly improved if the online platform automatically detected inaccurate product titles and notified the sellers of the inaccuracies.

Therefore, there is a need for improved methods and systems for detecting inaccuracies in product titles so that consumers may quickly find and purchase products while online shopping.

SUMMARY

One aspect of the present disclosure is directed to a computer-implemented system for detecting inaccuracy in a product title. The system may comprise at least one processor; and at least one non-transitory storage medium comprising instructions that, when executed by the at least one processor, cause the at least one processor to perform steps. The steps may comprise identifying, by running a string algorithm on a title associated with a product, at least one product type associated with the product, predicting, using a machine learning algorithm, at least one product type associated with the product based on the title associated with the product, detecting an inaccuracy in the title associated with the product, based on at least one of the identification or the prediction, and outputting, to a remote device, a message indicating that the title associated with the product comprises the inaccuracy.

In some embodiments, running a string algorithm on a title associated with a product may further comprise receiving a set of strings, generating a trie based on the received set of strings, including a first level of nodes for a first letter of the set of strings and n level of nodes for n letters beyond the first letter of the set of strings, receiving the title associated with the product, and traversing the generated trie using the title to find a match. In other embodiments, using the machine learning algorithm may further comprise receiving the title associated with the product, identifying one or more words in the title, wherein each word is represented by a character n-gram, learning a vector representation for each character n-gram of each word, and summing each character n-gram of each word to determine an overall word embedding.

In some embodiments, the at least one processor may be further configured to execute the instructions to determine a number of product types associated with the product, and determine that the title associated with the product comprises an inaccuracy when the number of product types associated with the product exceeds a predetermined threshold. In other embodiments, the at least one processor may be further configured to execute the instructions to determine that the title associated with the product comprises an inaccuracy when the product is associated with two or more unrelated product types. In yet another embodiment, the at least one processor may be further configured to execute the instructions to predict, using the machine learning algorithm, at least one product type associated with the product based on an image of the product. In some embodiments, the at least one processor may be further configured to execute the instructions to determine that the title associated with the product comprises an inaccuracy when the predicted product type based on the image of the product is different from the predicted product type based on the title associated with the product.

In other embodiments, the at least one processor may be further configured to execute the instructions to identify, by running the string algorithm on the title associated with the product, at least one brand associated with the product, and determine that the title associated with the product comprises an inaccuracy when two or more brands are associated with the product. In some embodiments, predicting, using a machine learning algorithm, at least one product type associated with the product based on the title associated with the product may further comprise embedding the at least one product type to a vector and determining a distance between the vector and a predetermined vector. In some embodiments, the predetermined vector may be associated with an actual product type associated with the product.

Another aspect of the present disclosure is directed to a method for detecting inaccuracy in a product title. The method may comprise identifying, by running a string algorithm on a title associated with a product, at least one product type associated with the product, predicting, using a machine learning algorithm, at least one product type associated with the product based on the title associated with the product, detecting an inaccuracy in the title associated with the product, based on at least one of the identification or the prediction, and outputting, to a remote device, a message indicating that the title associated with the product comprises the inaccuracy.

In some embodiments, running a string algorithm on a title associated with a product may further comprise receiving a set of strings, generating a trie based on the received set of strings, including a first level of nodes for a first letter of the set of strings and n level of nodes for n letters beyond the first letter of the set of strings, receiving the title associated with the product, and traversing the generated trie using the title to find a match. In other embodiments, using the machine learning algorithm may further comprise receiving the title associated with the product, identifying one or more words in the title, wherein each word is represented by a character n-gram, learning a vector representation for each character n-gram of each word, and summing each character n-gram of each word to determine an overall word embedding.

In some embodiments, the at least one processor may be further configured to execute the instructions to determine a number of product types associated with the product, and determine that the title associated with the product comprises an inaccuracy when the number of product types associated with the product exceeds a predetermined threshold. In other embodiments, the at least one processor may be further configured to execute the instructions to determine that the title associated with the product comprises an inaccuracy when the product is associated with two or more unrelated product types. In yet another embodiment, the at least one processor may be further configured to execute the instructions to predict, using the machine learning algorithm, at least one product type associated with the product based on an image of the product. In some embodiments, the at least one processor may be further configured to execute the instructions to determine that the title associated with the product comprises an inaccuracy when the predicted product type based on the image of the product is different from the predicted product type based on the title associated with the product.

In other embodiments, the at least one processor may be further configured to execute the instructions to identify, by running the string algorithm on the title associated with the product, at least one brand associated with the product, and determine that the title associated with the product comprises an inaccuracy when two or more brands are associated with the product. In some embodiments, predicting, using a machine learning algorithm, at least one product type associated with the product based on the title associated with the product may further comprise embedding the at least one product type to a vector and determining a distance between the vector and a predetermined vector associated with an actual product type of the product.

Yet another aspect of the present disclosure is directed to a computer-implemented system for detecting inaccuracy in a product title. The system may comprise at least one processor; and at least one non-transitory storage medium comprising instructions that, when executed by the at least one processor, cause the at least one processor to perform steps. The steps may comprise identifying, by running a string algorithm on a title associated with a product, at least one product type associated with the product, predicting, using a machine learning algorithm, at least one product type associated with the product based on the title associated with the product, detecting an inaccuracy in the title associated with the product, based on at least one of the identification or the prediction, and outputting, to a remote device, a message indicating that the title associated with the product comprises the inaccuracy. Running the string algorithm on a title may comprise receiving a set of strings, generating a trie based on the received set of strings, including a first level of nodes for a first letter of the set of strings and n level of nodes for n letters beyond the first letter of the set of strings, receiving the title associated with the product, and traversing the generated trie using the title to find a match. In addition, using the machine learning algorithm may comprise receiving the title associated with the product, identifying one or more words in the title, wherein each word is represented by a character n-gram, learning a vector representation for each character n-gram of each word, and summing each character n-gram of each word to determine an overall word embedding.

Other systems, methods, and computer-readable media are also discussed herein.

BRIEF DESCRIPTION OF THE DRAWINGS

Figure 1D:
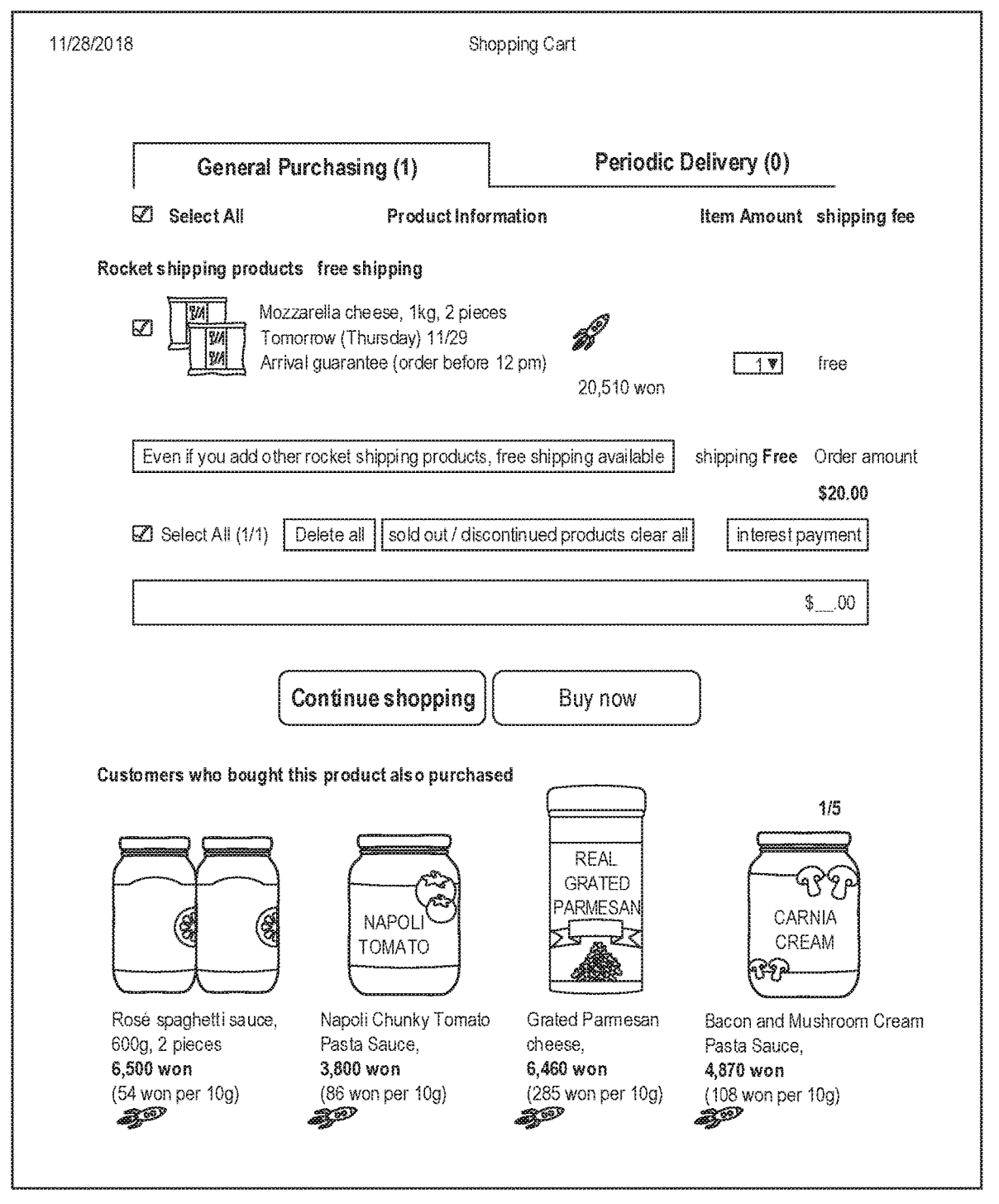

FIG. 1D depicts a sample Cart page that includes items in a virtual shopping cart along with interactive user interface elements, consistent with the disclosed embodiments.

DETAILED DESCRIPTION

Figure 1A:
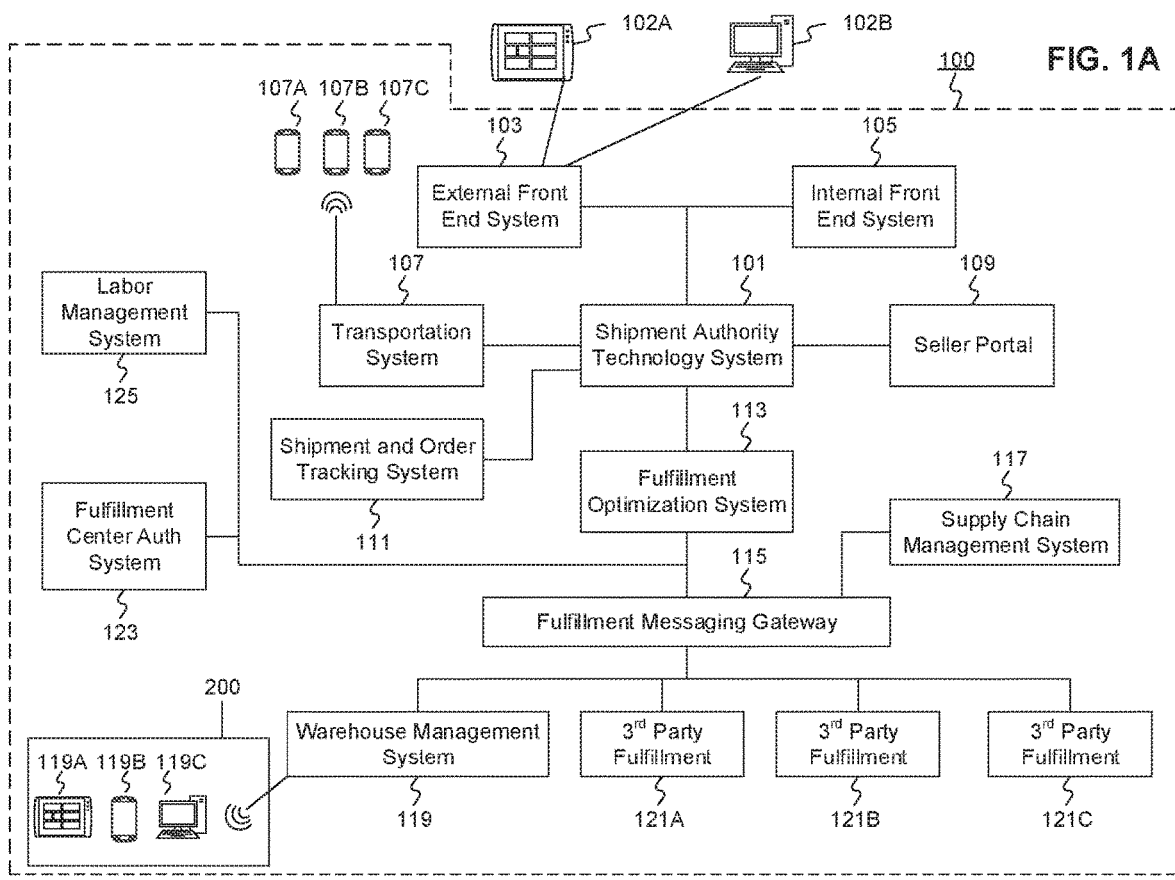
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for detecting inaccuracy in a product title. The disclosed embodiments are advantageously capable of using a string algorithm and/or a machine learning algorithm to identify and/or predict at least one product type associated with a product based on a title associated with the product.

In one implementation, a pre-processing system may pre-process the initial training data received from training data system to generate synthesized training data. For example, text-based initial training data may be pre-processed using any combination of methods, including stop word elimination, keyword tokenization, deduplication of keywords, and augmentation of the initial training data, and image-based initial training data may be pre-processed using image augmentation techniques (e.g., PyTorch). A hierarchical model trainer system may receive the text-based synthesized training data generated by the pre-processing system and an image model trainer system may receive the image-based synthesized training data generated by the pre-processing system. The hierarchical model trainer system and the image model trainer may generate and train at least one hierarchical model and at least one image model, respectively, using the received synthesized data for product categorization.

In some embodiments, a product category predictor may receive information associated with a first uncategorized product. For example, a seller may be prompted to enter a concatenated text string including the product name, attribute values, manufacturer, brand, and model number when attempting to register a product. The product category predictor may receive a request to predict a number of categories with the highest total probability scores. The product category predictor may use the hierarchical model to predict the most relevant categories of the first uncategorized product by recursively calculating probability scores of potential categories and subcategories. The product category predictor may subsequently sort the uncategorized product into one or more of the categories having the highest total probability scores.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
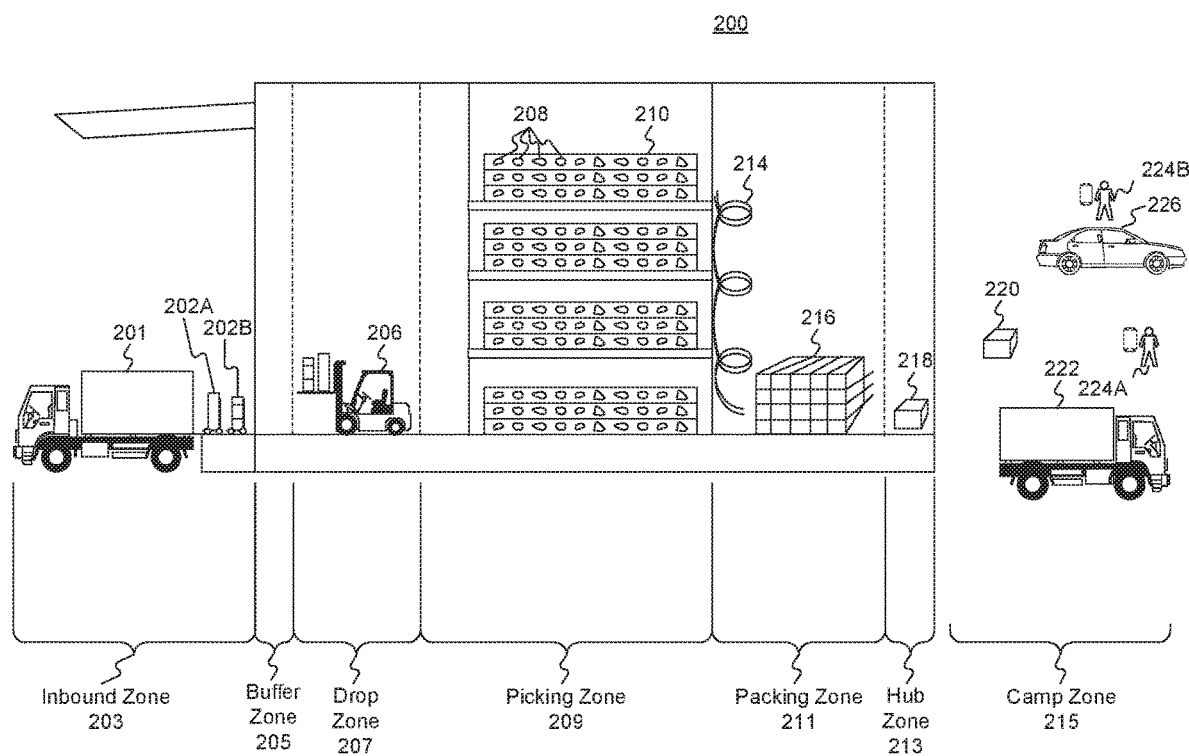
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119b.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
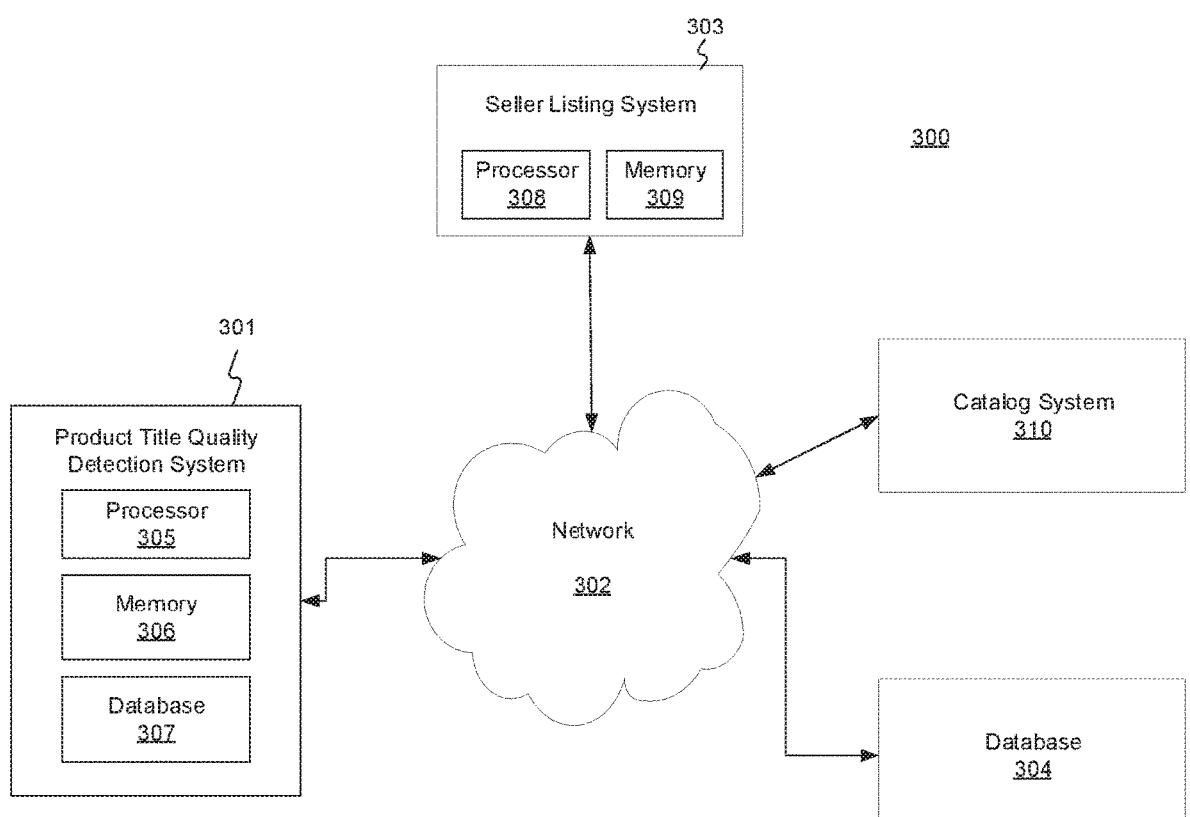
FIG. 3 is a schematic block diagram illustrating an exemplary embodiment of a system comprising computerized systems for detecting inaccuracy in a product title, consistent with the disclosed embodiments.

Referring to FIG. 3, a schematic block diagram illustrating an exemplary embodiment of a system for detecting inaccuracy in a product title is shown. As illustrated in FIG. 3, system 300 may comprise a product title quality detection system 301, a seller listing system 303, a catalog system 310, and database 304, each of which may communicate with each other via a network 302. In some embodiments, product title quality detection system 301, seller listing system 303, and catalog system 310 may communicate with each other and with the other components of system 300 via a direct connection, for example, using a cable. In some other embodiments, system 300 may be a part of system 100 of FIG. 1A and may communicate with the other components of system 100 (e.g., external front end system 103 or internal front end system 105) via network 302 or via a direct connection, for example, using a cable. Product title quality detection system 301, seller listing system 303, and/or catalog system 310 may each comprise a single computer or may each be configured as a distributed computer system including multiple computers that interoperate to perform one or more of the processes and functionalities associated with the disclosed examples.

As shown in FIG. 3, product title quality detection system 301 may comprise a processor 305, a memory 306, and a database 307. Seller listing system 303 may comprise a processor 308 and a memory 309. Catalog system 310 may also comprise a processor (not shown) and a memory (not shown). Processors 305 and 308 may be one or more known processing devices, such as a microprocessor from the Pentium™ family manufactured by Intel™ or the Turion™ family manufactured by AMD™. Processors 305 and 308 may constitute a single core or multiple core processor that executes parallel processes simultaneously. For example, processors 305 and 308 may use logical processors to simultaneously execute and control multiple processes. Processors 305 and 308 may implement virtual machine technologies or other known technologies to provide the ability to execute, control, run, manipulate, store, etc. multiple software processes, applications, programs, etc. In another example, processors 305 and 308 may include a multiple-core processor arrangement configured to provide parallel processing functionalities to allow product title quality detection system 301, seller listing system 303, and catalog system 310 to execute multiple processes simultaneously. One of ordinary skill in the art would understand that other types of processor arrangements could be implemented that provide for the capabilities disclosed herein.

Memories 306 and 309 may store one or more operating systems that perform known operating system functions when executed by processors 305 and 308, respectively. By way of example, the operating system may include Microsoft Windows, Unix, Linux, Android, Mac OS, iOS, or other types of operating systems. Accordingly, examples of the disclosed invention may operate and function with computer systems running any type of operating system. Memories 306 and 309 may be a volatile or non-volatile, magnetic, semiconductor, tape, optical, removable, non-removable, or other type of storage device or tangible computer readable medium.

Databases 304 and 307 may include, for example, Oracle™ databases, Sybase™ databases, or other relational databases or non-relational databases, such as Hadoop™ sequence files, HBase™, or Cassandra™. Databases 304 and 307 may include computing components (e.g., database management system, database server, etc.) configured to receive and process data requests for data stored in memory devices of the database(s) and to provide data from the database(s). Databases 304 and 307 may include NoSQL databases such as HBase, MongoDB™ or Cassandra™. Alternatively, databases 304 and 307 may include relational databases such as Oracle, MySQL and Microsoft SQL Server. In some embodiments, databases 304 and 307 may take the form of servers, general purpose computers, mainframe computers, or any combination of these components.

Databases 304 and 307 may store data that may be used by processors 305 and 308, respectively, for performing methods and processes associated with disclosed examples. As shown in FIG. 3, database 307 may be located in product title quality detection system 301. In some embodiments, database 304 may be located in seller listing system 303 and/or catalog system 310. In some embodiments, system 300 may include one or both of database 304 or database 307. Data stored in product title quality detection system 301 may include any suitable data associated with products that can be used to identify inaccuracies in titles associated with products. For example, data stored in product title quality detection system 301 may include product type names, product type keywords, related or synonymous product type keywords, product name, product image, product brand, product description, product manufacturer name, product category information, search tag(s) associated with the product, product attribute information, etc. In some embodiments, data stored in database 304 may include suitable training data associated with products. For example, data stored in database 304 may also include product type names, product type keywords, related or synonymous product type keywords, product name, product image, product brand, product description, product manufacturer name, product category information, search tag(s) associated with the product, product attribute information, etc. In some embodiments, such training data associated with products may be stored directly in catalog system 310, rather than in an external database, such as database 304. Accordingly, product title quality detection system 301 may communicate with catalog system 310 via network 302 to train one or more models and/or algorithms associated with product title quality detection system 301 using training data stored in catalog system 310.

Catalog system 310 may receive training data including product types associated with products and titles associated with products. Catalog system 310 may collect training data using a combination of different methods. Training data collection methods may include human labeled data, virtual product data, mapping guideline keyword data, or selection of live products. For example, catalog system 310 may receive training data from internal users (e.g., employees of an organization that owns, operates, or leases system 100) via internal front end system 105. In other embodiments, catalog system 310 may receive training data from seller listing system 303. For example, catalog system 310 may collect training data, such as titles associated with products and product types associated with products from one or more processors 308 of seller listing system 303.

Human labeled data may include product information manually input from one or more users. Virtual product data may include automatically generating augmented training data using existing product titles. For example, catalog system 310 may automatically generate at least one training data point including product types using keywords obtained from existing product titles. Generating virtual product data may improve robustness of the model(s) to be trained since the product type are retrieved from existing product titles.

Mapping guideline keyword data may include automatically generating augmented training data using live products. For example, catalog system 310 may automatically generate at least one training data point by searching a database, such as database 304, for a live product that is mapped to at least one keyword. If the live product is already mapped to a product identification number and contains the at least one keyword in one of its associated product titles, training data system 310 considers that live product to be assigned a correct and accurate product title and generates a new training data point that is a duplicate of the live product. Generating mapping guideline keyword data may improve robustness of the model(s) to be trained since it increases the amount of training data associated with correct and accurate product titles to feed into the model(s) to be trained.

In some embodiments, one or more processors 305 of product title quality detection system 301 may use training data from catalog system 310 to generate one or more models to predict a product type associated with a product based on a title associated with the product. For example, as discussed below, one or more processors 305 may generate a machine learning model, an image model, and/or a classification model to predict a product type associated with a product based on the product title.

In some embodiments, one or more processors 305 may detect an inaccuracy in a title associated with a product and automatically send a message to one or more processors 308 of seller listing system 303. The message may include a rejection message, a rejection code, a warning code, and/or a warning message, indicating that the product title comprises an inaccuracy. The message may also indicate that the product title needs correction. In some embodiments, one or more processors 305 may send a message to one or more processors 308 of seller listing system 303 and recommend a new product title to replace the inaccurate product title.

In some embodiments, one or more processors 305 may determine a product type associated with a product based on information associated with a user's log-in session. For example, one or more processors 305 may access a user's log-in session history, which may include information such as the products that the user has previously clicked-on or searched for. For example, the user's log-in session history may comprise a list of sequential products that the user clicked on during the user's previous log-in session. One or more processors 305 may determine a product type associated with each of the sequential products and identify a sequence of product types. One or more processors 305 may access one or more user's previous log-in sessions to identify sequences of product types that appeared frequently. Based on the identified sequences of product types that appeared frequently in users' log-in session, one or more processors 305 may determine that one or more product types in the identified sequences of product types are related to each other.

System 300 may also comprise a network 302. Network 302 may be one or more of a wireless network, a wired network or any combination of wireless network and wired network. For example, network 302 may include one or more of a fiber optic network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving data.

In addition, network 302 may include, but not be limited to, telephone lines, fiber optics, IEEE Ethernet 802.3, a wide area network ("WAN"), a local area network ("LAN"), or a global network such as the Internet. Also network 302 may support an Internet network, a wireless communication network, a cellular network, or the like, or any combination thereof. Network 302 may further include one network, or any number of the exemplary types of networks mentioned above, operating as a stand-alone network or in cooperation with each other. Network 302 may utilize one or more protocols of one or more network elements to which they are communicatively coupled. Network 302 may translate to or from other protocols to one or more protocols of network devices. Although network 302 is depicted as a single network, it should be appreciated that according to one or more embodiments, network 302 may comprise a plurality of interconnected networks, such as, for example, the Internet, a service provider's network, a cable television network, corporate networks, and home networks.

Figure 4:
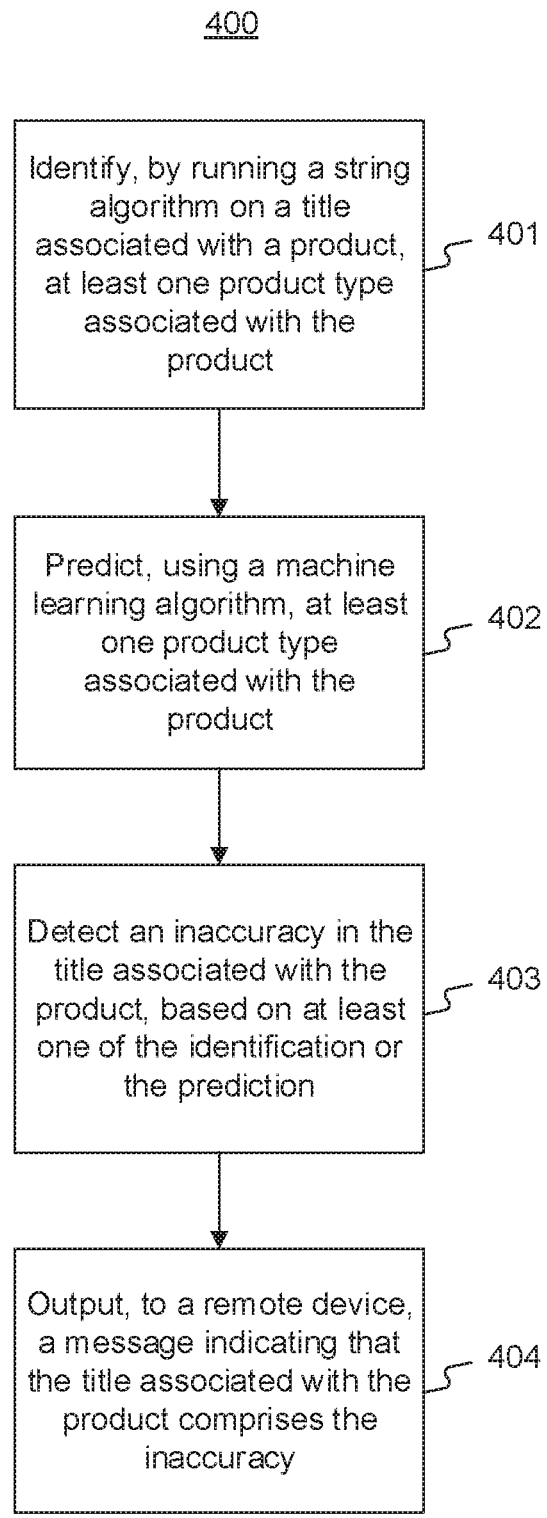
FIG. 4 is a flowchart illustrating an exemplary embodiment of a method for detecting inaccuracy in a product title, consistent with the disclosed embodiments.

FIG. 4 is a flow chart illustrating an exemplary method 400 for detecting inaccuracy in a product title. This exemplary method is provided by way of example. Method 400 shown in FIG. 4 can be executed or otherwise performed by one or more combinations of various systems. Method 400 as described below may be carried out by product title quality detection system 301, as shown in FIG. 3, by way of example, and various elements of that system are referenced in explaining the method of FIG. 4. Each block shown in FIG. 4 represents one or more processes, methods, or subroutines in the exemplary method 400. Referring to FIG. 4, exemplary method 400 may begin at block 401.

At block 401, one or more processors 305 of product title quality detection system 301 may identify, by running a string algorithm on a title associated with a product, at least one product type associated with the product. For example, one or more processors 305 may access seller listing system 303 and monitor system 303 for any product title inaccuracies. One or more processors 305 may monitor products listed on seller listing system 303 continuously or on a predetermined schedule (e.g., once every 30 minutes, once every hour, once every 5 hours, once every 10 hours, once every 24 hours, once a week, twice a week, etc.).

In order to monitor products listed on seller listing system 303 to identify any product title inaccuracies, one or more processors 305 may run a string algorithm on a product title. For example, one or more processors 305 may tokenize keywords in the product title by referencing a token dictionary stored in a database, such as database 304 or database 307, and implementing a string algorithm, such as an Aho-Corasick algorithm, to determine whether or not to split a keyword into multiple keywords. For example, keywords in the product title written in certain languages (such as Korean) may be stored as a single string of text without spaces. (A fluent speaker would understand that this string of text may be split into various combinations of words.) One or more processors 305 may implement an Aho-Corasick algorithm, which is a dictionary-matching algorithm that locates elements of a finite set of strings (e.g., the "dictionary") within an input text. The algorithm matches all the strings simultaneously so that one or more processors 305 may collect the actual keywords in the product title while removing "split" words that are not listed in the stored dictionary. Keyword tokenization may increase robustness of the model(s) to be trained by removing superfluous words that slow down the model training process from the training data set. Additionally or alternatively, one or more processors 305 may implement any other string algorithm(s) that is capable of generating and processing trie data.

In some embodiments, running a string algorithm, such as an Aho-Corasick algorithm, on the product title may comprise receiving a set of strings within the product title and generating a trie based on the received set of strings. The trie may comprise a first level of nodes for a first letter of the set of strings and n level of nodes for n letters beyond the first letter of the set of strings. After receiving the product title, one or more processors 305 may traverse the trie using the product title to find a match. By traversing the generated trie, one or more processors 305 may split the set of strings in the product title into actual keywords and "split" words.

After removing "split" words and identifying one or more actual keywords in the product title by running a string algorithm, one or more processors 305 may identify a product type associated with the product based on the actual keywords extracted from the product title. For example, database 304 or database 307 may store a look-up table, including product types and keywords associated with each product type. One or more processors 305 may compare the actual keywords extracted from the title associated with the product with keywords stored in the look-up table and determine at least one product type associated with the product. In some embodiments, keywords may comprise brands associated with the products. For example, by running the string algorithm, one or more processors 305 may extract one or more brands from the product title.

After identifying at least one product type associated with the product by running a string algorithm, method 400 may proceed to block 402. At block 402, one or more processors 305 of product title quality detection system 301 may predict, using a machine learning algorithm, at least one product type associated with the product. For example, one or more processors 305 may identify the keywords from the product title, such as by running the string algorithm mentioned above, and use a library for learning of word embeddings and text classification, such as fastText, to transform the keywords into vector representations. One or more processors 305 may use the library to learn a vector representation for each keyword's character n-gram. For example, each keyword may be represented by a character-gram. Each keyword may then be represented as a bag of character n-grams, and one or more processors 305 may sum each character-gram of each keyword to determine an overall word embedding. Accordingly, the overall word embedding may be the sum of the character n-grams.

By way of example, one or more processors 305 may automatically set the n-gram to 3, in which case the vector for the word "where" would be represented by a sum of trigrams: <wh, whe, her, ere, re>, where the brackets <, > are boundary symbols that denote the beginning and end of a word. After each word is represented as a sum of n-grams, a latent text embedding is derived as an average of the word embedding, at which point the text embedding may be used by one or more processors 305 to predict at least one product type associated with a product, based on the title associated with the product. This process may be advantageous in identifying rare keywords or keywords that were not included in a training data set.

In some embodiments, after predicting at least one product type associated with the product, one or more processors 305 may embed each product type to a vector. Accordingly, if a plurality of product types are identified as being associated with the product, then one or more processors 305 may embed each of the plurality of product types into a vector. One or more processors 305 may then determine a distance and/or a standard deviation between the vector(s) and a predetermined vector. The predetermined vector may be associated with an actual product type associated with the product. In some embodiments, one or more processors 305 may adapt a t-Stochastic Neighbor Embedding (SNE) algorithm to normalize distance distributions between the embedded vectors.

After identifying at least one product type by running a string algorithm and after predicting at least one product type by using a machine learning algorithm, method 400 may proceed to block 403. At block 403, one or more processors 305 of product title quality detection system 301 may detect an inaccuracy in the title associated with the product, based on at least one of the identification (at block 401) or the prediction (at block 402). In some embodiments, one or more processors 305 may determine a number of product types associated with the product based on the identification and/or the prediction. If the number of product types associated with the product exceeds a predetermined threshold, one or more processors 305 may determine that the product title comprises an inaccuracy. For example, if a product is associated with more than 3, 4, 5, or 10 product types, one or more processors 305 may determine that the product title associated with the product comprises an inaccuracy.

In other embodiments, one or more processors 305 may determine that the product title comprises an inaccuracy if the product is associated with two or more unrelated product types. For example, based on the identification and/or the prediction using the product title, if one or more processor 305 determines that the product is associated with a product type "hat" and a product type "shoe," which are unrelated to each other, one or more processors 305 may determine that the product title comprises an inaccuracy.

In yet another embodiment, as discussed above, one or more processors 305 may run a string algorithm to identify at least one brand associated with the product from the product title. If one or more processors 305 determines that the product title comprises two or more brand keywords, then one or more processors 305 may determine that the product title comprises an inaccuracy because the probability that a product is associated with two or more brands is low.

In some embodiments, one or more processors 305 may use a machine learning algorithm to predict at least one product type associated with the product based on an image of the product. One or more processors 305 may use an image model, such as Xception model, to predict at least one product type associated with an image of the product. The image of the product may be retrieved from catalog system 310, seller listing system 303, and/or database 304. When the predicted product type based on the image of the product is different from the predicted product type based on the title associated with the product (at block 402), then one or more processors 305 may determine that the title associated with the product comprises an inaccuracy.

In some embodiments, one or more processors 305 may train the image model, such as Xception model, using one or more product types determined by running a string algorithm on a product title. In some embodiments, one or more processors 305 may only use one or more product types determined by running a string algorithm on product titles associated with products that are sold directly by the original retailer, rather than through a third-party retailer, because product titles associated with products that are sold directly by the original retailer may contain fewer inaccuracies.

In some embodiments, one or more processor 305 may use an image model that comprises a deep convolutional neural network architecture comprising a linear stack of depthwise separable convolution layers with residual connections. One or more processors 305 may input an image, such as an image of the product, in the image model. The image may comprise a predetermined number of channels and a predetermined dimension. One or more processors 305 may apply a convolution filter of a predetermined size on the image. However, instead of applying a convolution filter over all of the predetermined number of channels of the image, one or more processors 305 may only apply the convolution filter for 1 kernel. Then, one or more processors 305 may perform channel-wise spatial convolution on the image. Accordingly, one or more processors 305 may first apply a 1×1 convolution (e.g., "pointwise convolution") on the image and then apply a channel-wise spatial convolution (e.g., "depthwise convolution") on the image.

At block 404, one or more processors 305 of product title quality detection system 301 may output, to a remote device, such as seller listing system 303 of FIG. 3, a message indicating that the title associated with the product comprises the inaccuracy. For example, one or more processors 305 may send a message to one or more processors 308 of seller listing system 303. The message may include a rejection message, a rejection code, a warning code, and/or a warning message, indicating that the product title comprises an inaccuracy. The message may also indicate that the product title needs correction. In some embodiments, one or more processors 305 may send a message to one or more processors 308 of seller listing system 303 and recommend a new product title to replace the inaccurate product title. In some embodiments, one or more processors 305 may send a message to one or more processors 308 of seller listing system 303, including a suggestion and/or an instruction to delete certain letters, words, numbers, symbols, etc. in the product title. The recommendation and/or suggestion may be tailored to each product title. In some embodiments, one or more processors 305 may directly access seller listing system 303 and revise and/or replace the product title in real-time. Accordingly, one or more processors 305 of product title quality detection system 301 may be able to control the product titles listed on seller listing system 303. Additionally or alternatively, rather than sending the message to a remote device, one or more processors 305 may send the message to one or more systems in system 100 of FIG. 1A.

Figure 5:
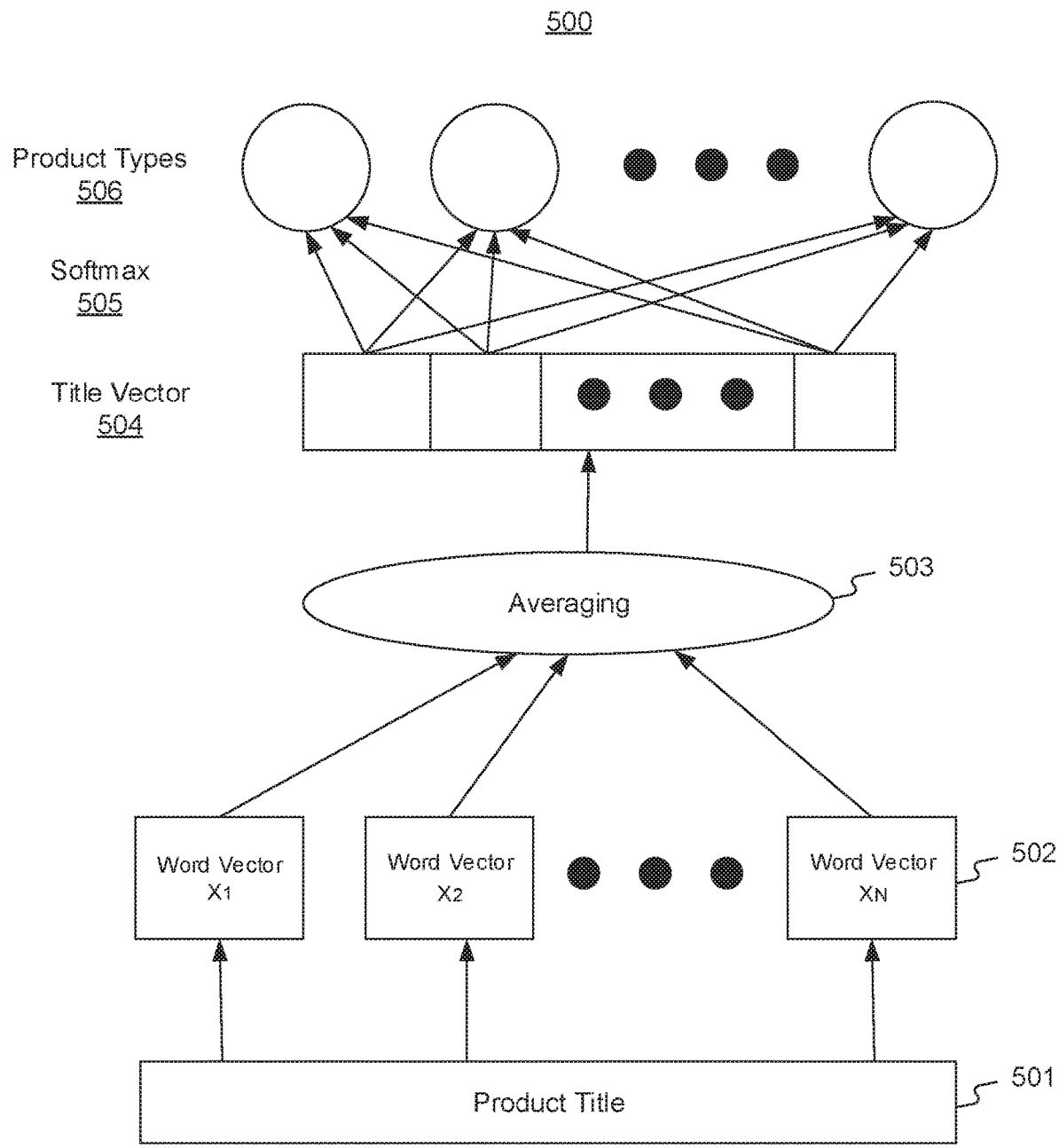
FIG. 5 is a diagram illustrating an exemplary embodiment of a method for using a machine learning algorithm to predict a product type associated with a product based on a product title, consistent with the disclosed embodiments.

FIG. 5 illustrates an exemplary embodiment of a method for using a machine learning algorithm, such as fastText, to identify a product type, consistent with the disclosed embodiments. As seen in FIG. 5, one or more processors 305 may receive a product title 501 (e.g., "Product Title"), which may be a title associated with a product on seller listing system 303. The words in the title may be split and segmented to have spaces between each word in the product title 501 and embedded in a corresponding vector. Thus, each word may be represented as a vector 502 (e.g., "Word Vector $X_1$," "Word Vector $X_2$," and "Word Vector $X_N$"). Once each word in the product title is embedded and represented as vector 502, vectors 502 may be summed and averaged at 503 to generate a title embedding vector 504 (e.g., "Title Vector"). Accordingly, the title embedding vector 504 may be a vector representation of the product title 501 (e.g., "Product Title"). Afterwards, by applying softmax 505 on the title embedding vector 504, one or more processors 305 may output a probability of a target product type 506 given the context of the product title. In particular, one or more processors 305 may output one or more product types 506 based on the product title 501 and a probability of each of the one or more product types 506 given the context. By implementing softmax 505, one or more processors 305 may be configured to take as input the title embedding vector 504 and normalize the title embedding vector 504 into a probability distribution. Accordingly, one or more processors 305 may be configured to predict one or more product types associated with the product based on the product title, using a machine learning algorithm.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for detecting inaccuracy in product title, the system comprising:
   a memory storing instructions; and
   at least one processor configured to execute the instructions to:
   identify, by running a string algorithm on a title associated with a product, at least one product type associated with the product, wherein running a string algorithm on a title associated with a product further comprises:
   receiving a set of strings within the title;
   generating a trie based on the received set of strings, including a first level of nodes for a first letter of the set of strings and n level of nodes for n letters beyond the first letter of the set of strings;
   receiving the title associated with the product; and
   traversing the generated trie using the title to remove a first subset of the set of strings and find a match;
   predict, using a machine learning algorithm, at least one product type associated with the product based on the title associated with the product, wherein predicting the at least one product type using the machine learning algorithm further comprises:
   identifying one or more words in the title, wherein each word is represented by one or more character n-grams;
   summing the one or more character n-grams to determine an overall word embedding vector for each of the one or more words;
   summing overall word embedding vectors for the one or more words;
   averaging the sum of the overall word embedding vectors to determine a title embedding vector comprising a vector representation of the title associated with the product; and applying softmax on the title embedding vector to determine the at least one product type associated with the product;
detect an inaccuracy in the title associated with the product based on the product being associated with two or more unrelated product types; and
output, to a remote device, a message indicating that the title associated with the product comprises the inaccuracy.

2. The system of claim 1, wherein the at least one processor is further configured to execute the instructions to:
determine a number of product types associated with the product; and
determine that the title associated with the product comprises an inaccuracy when the number of product types associated with the product exceeds a predetermined threshold.

3. The system of claim 1, wherein the at least one processor is further configured to execute the instructions to predict, using the machine learning algorithm, at least one product type associated with the product based on an image of the product.

4. The system of claim 3, wherein the at least one processor is further configured to execute the instructions to determine that the title associated with the product comprises an inaccuracy when the predicted product type based on the image of the product is different from the predicted product type based on the title associated with the product.

5. The system of claim 1, wherein the at least one processor is further configured to execute the instructions to:
identify, by running the string algorithm on the title associated with the product, at least one brand associated with the product; and
determine that the title associated with the product comprises an inaccuracy when two or more brands are associated with the product.

6. The system of claim 1, wherein predicting, using a machine learning algorithm, at least one product type associated with the product based on the title associated with the product further comprises embedding the at least one product type to a vector and determining a distance between the vector and a predetermined vector.

7. The system of claim 6, wherein the predetermined vector is associated with an actual product type associated with the product.

8. A computer-implemented method for detecting inaccuracy in product title, the method comprising:
identifying, by running a string algorithm on a title associated with a product, at least one product type associated with the product, wherein running a string algorithm on a title associated with a product further comprises:
receiving a set of strings within the title;
generating a trie based on the received set of strings, including a first level of nodes for a first letter of the set of strings and n level of nodes for n letters beyond the first letter of the set of strings;
receiving the title associated with the product; and
traversing the generated trie using the title to remove a first subset of the set of strings and find a match;
predicting, using a machine learning algorithm, at least one product type associated with the product, wherein predicting the at least one product type using the machine learning algorithm further comprises:
identifying one or more words in the title, wherein each word is represented by one or more character n-grams;
summing the one or more character n-grams to determine an overall word embedding vector for each of the one or more words;
summing overall word embedding vectors for the one or more words;
averaging the sum of the overall word embedding vectors to determine a title embedding vector comprising a vector representation of the title associated with the product; and
applying softmax on the title embedding vector to determine the at least one product type associated with the product;
detecting an inaccuracy in the title associated with the product based on the product being associated with two or more unrelated product types; and
outputting, to a remote device, a message indicating that the title associated with the product comprises the inaccuracy.

9. The method of claim 8, further comprising:
determining a number of product types associated with the product; and
determining that the title associated with the product comprises an inaccuracy when the number of product types associated with the product exceeds a predetermined threshold.

10. The method of claim 8, further comprising predicting, using the machine learning algorithm, at least one product type associated with the product based on an image of the product.

11. The method of claim 10, further comprising determining that the title associated with the product comprises an inaccuracy when the predicted product type based on the image of the product is different from the predicted product type based on the title associated with the product.

12. The method of claim 8, further comprising:
identifying, by running the string algorithm on the title associated with the product, at least one brand associated with the product; and
determining that the title associated with the product comprises an inaccuracy when two or more brands are associated with the product.

13. The method of claim 8, wherein predicting, using a machine learning algorithm, at least one product type associated with the product based on the title associated with the product further comprises embedding the at least one product type to a vector and determining a distance between the vector and a predetermined vector associated with an actual product type of the product.

14. A computer-implemented system for detecting inaccuracy in product title, the system comprising:
a memory storing instructions; and
at least one processor configured to execute the instructions to:
identify, by running a string algorithm on a title associated with a product, at least one product type associated with the product, wherein running the string algorithm on the title comprises:
receiving a set of strings within the title;
generating a trie based on the received set of strings, including a first level of nodes for a first letter of the set of strings and n level of nodes for n letters beyond the first letter of the set of strings;
receiving the title associated with the product; and
traversing the generated trie using the title to remove a first subset of the set of strings and find a match;
predict, using a machine learning algorithm, at least one product type associated with the product, wherein predicting the at least one product type using the machine learning algorithm further comprises:
receiving the title associated with the product;
identifying one or more words in the title, wherein each word is represented by one or more character n-gram;
summing the one or more character n-grams to determine an overall word embedding vector for each of the one or more words;
learning a vector representation for each character n-gram of each word;
summing the one or more character n-grams to determine an overall word embedding for each of the one or more words;
summing overall word embedding vectors for the one or more words;
averaging the sum of the overall word embedding vectors to determine a title embedding vector comprising a vector representation of the title associated with the product; and
applying softmax on the title embedding vector to determine the at least one product type associated with the product;
detect an inaccuracy in the title associated with the product based on the product being associated with two or more unrelated product types; and
output, to a remote device, a message indicating that the title associated with the product comprises the inaccuracy.

* * * * *